INVENTORS
MAURICE M. BRUNDIGE
GUNTHER K. HUNGER
HARRY F. KOHNE, JR.
FREDERICK L. KURRLE

BY Richard L. Schmelz
ATTORNEY

INVENTORS
MAURICE M. BRUNDIGE
GUNTHER K. HUNGER
HARRY F. KOHNE, JR.
FREDERICK L. KURRLE

BY Richard A. Schmalz

ATTORNEY 3,342,921
PROCESS FOR PRODUCING FIBROUS FILLER HAVING HIGH WET END RETENTION
Maurice M. Brundige, Laurel, Gunther K. Hunger, Ellicott City, Harry F. Kohne, Jr., Glenwood, and Frederick L. Kurrle, Laurel, Md., assignors to West Virginia Pulp and Paper Company, New York, N.Y., a corporation of Delaware
Filed Mar. 16, 1966, Ser. No. 534,855
23 Claims. (Cl. 264—200)

This invention relates to compositions of matter and to processes for their production. More particularly, it relates to novel and useful fibrous, white, bright, opaque filler materials, which have wet end retentions heretofore unknown for conventional fillers, and to methods of producing the novel fillers.

The invention is based upon the discovery that thermoplastic filament-forming materials, such as cellulose esters, dissolved in organic solvents, can be sprayed into a non-solvent to produce a fiber-like filler material which is white and opaque due to a blushing phenomenon. The resulting blushed, fibrous cellulose ester differs radically from normal high opacity fillers, such as clay and $TiO_2$, in that it has neither a high refractive index nor an extremely small particle size, but it possesses high opacity, as shown by its light scattering coefficient, and high retention in a papermaking process due to its fibrous nature. Unlike conventional fillers, the synthetic fibers of this invention are capable of felting with each other and with other fibers due to their fibrous nature, and waterleaves containing 100% of the synthetic fibers of this invention may be produced. Further, the novel fibrous filler materials possess microporous structures, are capable of accepting water and, therefore, are capable of accepting paper coatings.

Cellulose esters in spun filament form are known in the art, as described in United States Patents 2,070,031 and 2,087,019. Unblushed cellulose acetate fibers are known in the art and may be produced by the process described in United States Patent 2,988,469, wherein a cellulose acetate containing solution is extruded into a high velocity unidirectional, free flowing jet stream to produce unblushed fibers without the formation of shot. However, all of these patents fail to recognize the possibility of and the need for producing blushed fibers for use as filler materials. The presence of unblushed filaments in a paper stock can cause non-uniform coating lay due to the fact that the translucent filaments resist water, and the paper will not accept coating in a uniform manner.

The trend in the paper industry toward lighter weight printing papers has made it necessary to find a means for maintaining in light weight sheets the optical properties normally found in heavier weight papers. The use of conventional filler pigments, such as clay and $TiO_2$, in increased amounts to obtain the desired optical properties, results in severe deterioration of strength properties which can not be tolerated in an already weakened light weight paper. The fibrous, white, opaque cellulose derivative fillers of the present invention provide means for obtaining the desired optical properties. The fibrous fillers of this invention can be added to normal fillers to increase the optical properties of the finished paper without seriously affecting the strength properties of the paper, and they can be added at the wet end of a papermaking process with a retention of up to 90%, as compared to a retention of about 30% for clay and 40% for $TiO_2$. With the use of the novel fillers of this invention, a 26 pound basis weight paper (per 3300 sq. ft.) can be produced which has optical properties equal to those of a conventional 30 pound paper.

The novel fibrous fillers of this invention are prepared by an atomizing spray technique wherein a fiber-forming spraying liquid, with potential blushing characteristics, is sprayed into a precipitating bath containing a non-solvent for the solute portion of the spraying liquid. More particularly, a spray formulation which includes a cellulose ester such as cellulose acetate or cellulose acetate butyrate, a water-miscible organic solvent such as acetone, and a critical volume of water is fed under pressure to one or more atomizing spray nozzles located at a critical distance from a precipitating bath of water or water and acetone. As the spray formulation is sprayed from the atomizing nozzle, fibers of the blushed cellulose ester are emitted, and the blushed fibers are collected in the precipitating tank where the blushing phenomenon continues to completion as the remaining acetone-solvent in the fibers is replaced by the non-solvent water which is miscible with the acetone. The final product is a white, opaque, bright, fibrous cellulose ester having a fiber length in the range of about .03 mm. to 1.86 mm. and a width ranging from about 2 to 51 microns.

If a solution of a cellulose ester dissolved in acetone is sprayed into a water bath, partial blushing of the resultant product occurs, but unblushed material is also formed, and when incorporated into paper, the unblushed cellulose ester fibers take the form of clear shiners which are non-receptive to paper coatings or printing inks. As part of this invention, it has been found that in order to produce a fibrous product which is completely receptive to paper coatings, an amount of non-solvent, such as water, for the cellulose ester is needed in the spray formulation to insure the blushing of most, if not all, fibers. If this amount of water is insufficient, the optical properties of the fibrous filler suffer because complete blushing is not obtained. If the amount of water is excessive, the cellulose ester can not be dissolved. The amount of water that can be safely tolerated in the liquid carrier for the cellulose ester in the spray formulation is that amount bearing the relationship of up to one part water per three parts acetone.

Wetting agents may be used in the spray formulation of this invention to influence the interfacial tension of the spray solution. A wetting agent, such as soap, lowers the interfacial tension, and a finer particle size distribution of fibers is obtainable. Wetting agents which have been used successfully in the present invention are fatty acid soaps such as sodium stearate, potassium stearate, sodium and potassium oleates, and sodium and potassium palmitates, trisodium phosphate, sodium phosphate, nonylphenoxypoly (ethyleneoxy) ethanol, polyalkylene glycol, and polyoxyethylinated-alkyl aminoamide, in amounts varying up to about 5% of the water component of the spray formulation. It is believed that when a spray formulation is sprayed according to the present invention, the fluid spray is disrupted by the air, and the fluid breaks into filaments which are detached from the fluid mass. These filaments normally contract due to surface tension. In our process, the adjustment of the spray nozzle distance from the precipitating bath and the use of a wetting agent in the spray formulation inhibit the formation of droplets and maintain the fibrous structure of the blushed product. The use of a wetting agent is preferred but is not necessary to the formation of blushed fibers.

As mentioned above, the distance from the atomizing spray nozzle to the precipitating bath is also an important factor in the production of the novel fibrous fillers of this invention. Distances ranging from about ½ to 4½ inches have been utilized successfully, with a preferred distance of about one inch. It has been found that if a distance of over 4½ inches from the spray nozzle to the precipitating bath is employed, the product loses its fibrous nature in favor of spherical particles. Accordingly, when the spherical-like product is incorporated into a paper furnish, the final paper product has a mottled appearance, especially on the felt side, since the spherical-like filler has a tendency to be buoyant and is not uniformly dispersed throughout the sheet. Thus, the blushed fibers form the preferred embodiment of this invention, but blushed cellulose esters in other particulate form, such as the spherical-like "shot," may be used as filler material.

The spray formulation may contain a cellulose ester, such as cellulose acetate, cellulose acetate butyrate, or benzyl cellulose, or mixtures thereof. The preferred thermoplastic filament formers are cellulose acetate and cellulose acetate butyrate, and the spray formulation may contain any acetone to resin ratio from about 3 parts acetone to 1 part resin, below which ratio it becomes difficult to dissolve the resin. Ratios of acetone to resin up to about 15 to 1 have been employed successfully, with a preferred range from about 4 to 1 to 7 to 1. Ratios of higher than 15 to 1 may be used but such ratios become economically unfeasible.

Atomizing spray nozzles with fluid nozzle diameters ranging from about .020 inch to .100 inch have been employed, with a preferred nozzle diameter of .040 inch. An air compressor, supplying air to the nozzles at pressures varying from 40 to 80 p.s.i.g., has been used. Larger diameter nozzles than .100 inch may be employed with a corresponding increase in air pressure. It has been found that an air pressure of at least 40 p.s.i.g. is preferred when nozzles with fluid orifice diameters from .040 to .100 inch are used.

Plasticizers may be used in the spray formulation and we have found improved optical properties of the fibrous filler materials of this invention when a plasticizer is used. A plasticizer, such as di-n-butyl sebacate, has been used in spray formulations in amounts varying up to about 50 parts plasticizer by weight per 100 parts cellulose ester, but the use of more than up to about 10 parts plasticizer only reduces the strength properties of the fibrous filler and the paper into which the filler is incorporated, without significantly improving the scattering coefficient of the filler.

Not only do the unique filler materials of this invention improve the optical properties of paper, but paper containing the novel fillers is smoother under equal processing than paper containing conventional filler clay. The smoothness of the base-stock containing the novel fillers is not lost during a subsequent coating operation, and the smoothness carries through to the final coated paper and influences the printability of the final product.

To aid in the understanding of the invention, reference will be made to the drawings forming part of this specification, in which.

*Example 1*

Figure 1:
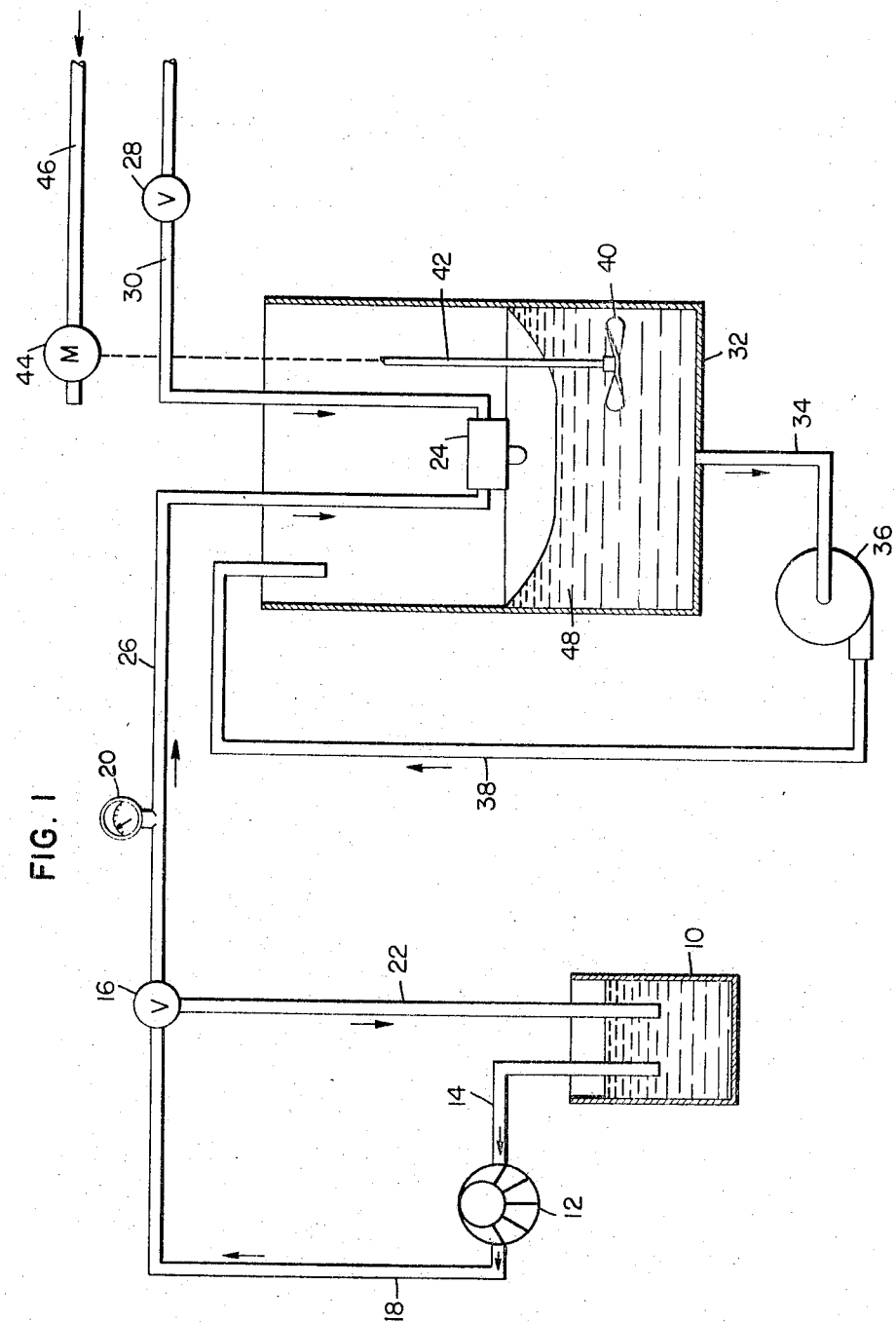
FIGURE 1 is a diagrammatic illustration of a process and apparatus employed in the present invention.

A spray formulation having a solvent-resin weight ratio of 13.3 to 1 was prepared according to the following:

| | Parts by wt. |
|---|---|
| Acetone | 1500 |
| Water | 500 |
| Sodium stearate soap | 10 |
| Scrap cellulose acetate butyrate (80%) | 112.5 |

The sodium stearate soap was first dissolved in the water component which had been heated to about 60–70° C. After the soap solution cooled to about 40° C., it was added to the acetone component under agitation. Finally, the cellulose acetate butyrate (scrap medical X-ray film, manufactured by Kodak, 80% cellulose acetate butyrate) was dissolved in the acetone-water-soap solution to complete the spray formulation.

A fibrous filler was made from the above formulation by a technique which will be described with the aid of FIGURE 1. The spray solution was placed in holding tank 10 which was connected to ¼ H.P. vane pump 12 by means of ¼ inch copper tubing 14. Three-way valve 16 was connected to vane pump 12 by means of tubing 18. A solvent-resin by-pass line 22 connected the valve 16 with the holding tank 10. A pneumatic atomizing nozzle 24, of known construction, was connected to valve 16 by line 26 and was connected to air regulator valve 28 by line 30. Pressure gauge 20 was placed in line 26 to provide means for determining the formulation feed rate. A stainless steel circulating tank 32 was provided to hold the precipitating bath, and tank 32 was equipped with a tank circulating line 34 which connected with a centrifugal pump 36. Return line 38 connected pump 36 with the open top of tank 32. A two blade propeller 40, on shaft 42, was provided within tank 32 and was driven at 200 r.p.m. by air motor 44 supplied with air by air line 46 to create a vortex in the precipitating bath 48.

Nozzle 24 had a fluid orifice diameter of approximately .040 inch and was set first at a distance of approximately one inch from the surface of the vortex of the precipitating bath 48. The spray formulation noted above was pumped from holding tank 10 to spray nozzle 24 by means of pump 12 via lines 14, 18 and 26 and, at the same time, air at a pressure of 60 p.s.i.g. was supplied to nozzle 24 by line 30. The atomized spray formulation emitted from nozzle 24 was in the form of blushed fibers of cellulose acetate butyrate, and the blushing phenomenon continued as the fibers collected in the precipitating bath 48 of water to yield bright, white, opaque fibers having a microporous structure. The fibrous filler slurry was then removed from tank 32, filtered through a Buchner funnel, washed to remove residual soap and acetone, and then reslurried at about 5% solids in water and given a three minute high speed homogenizer treatment to break any knots at the ends of the individual fibers.

*Example 2*

The same spray formulation as set out in Example 1 was sprayed under identical conditions except that the spray nozzle was placed at a distance of approximately 4½ inches from the precipitating bath 48 of water. The resultant fibrous slurry was filtered and washed and given a three minute high speed homogenizer treatment as in Example 1.

*Examples 3–5*

Spray formulations with varying acetone-resin ratios were formulated and sprayed under identical conditions as set out in Example 1, i.e., the nozzle orifice diameter was .040 inch and the distance from the nozzle to the precipitating bath was one inch. In each of the following examples, the spray formulation of Example 1 was used except that varying amounts of scrap cellulose acetate butyrate were used in the formulations according to the following with parts by weight:

| Example No. | Parts Cellulose Acetate Butyrate | Solvent-Resin Ratio |
|---|---|---|
| Example 3 | 150.0 | 10–1 |
| Example 4 | 187.5 | 8–1 |
| Example 5 | 225.0 | 6.6–1 |

The fillers produced were filtered, washed and given a three minute high speed homogenizer treatment.

Examples 6–8

In this series of runs, spray formulations with varying acetone-resin ratios were sprayed under conditions identical to those of Example 2, i.e., the nozzle orifice diameter was .040 inch and the distance from the nozzle to the precipitating bath was 4½ inches. The spray formulation of Example 1 was used, with the amounts by weight of scrap cellulose acetate butyrate in the formulations varying according to the following:

| Example No. | Parts Cellulose Acetate Butyrate | Solvent-Resin Ratio |
|---|---|---|
| Example 6 | 150.0 | 10-1 |
| Example 7 | 187.5 | 8-1 |
| Example 8 | 225.0 | 6.6-1 |

The fillers produced were filtered, washed and given a three minute high speed homogenizer treatment.

One gram samples of each of the fillers from Examples 1–8, diluted with water to a consistency of .1%, were tested for Williams freeness (Tappi Routine Control Methods, RC-110, using a one gram sample instead of a 3 gram sample) in order to characterize the fillers, with the following results:

TABLE 1

| Filler | Nozzle Distance (in.) | Williams Freeness (sec.) | Solvent-Resin Ratio |
|---|---|---|---|
| Example 1 | 1 | 573 | 13.3-1 |
| Example 2 | 4½ | 42 | 13.3-1 |
| Example 3 | 1 | 107 | 10-1 |
| Example 4 | 1 | 70 | 8-1 |
| Example 5 | 1 | 78 | 6.6-1 |
| Example 6 | 4½ | 101 | 10-1 |
| Example 7 | 4½ | 65 | 8-1 |
| Example 8 | 4½ | 23 | 6.6-1 |

From the above, it can be seen that there was a decrease in freeness as the acetone-resin ratio was lowered, and that the fillers produced at a nozzle distance of 4½ inches had lower freeness values than those produced at a nozzle distance of 1 inch. In general, we have found that fillers with longer drainage periods produce better optical properties in basestocks into which the fillers are incorporated.

Handsheets which included the fillers of Examples 2–8 were prepared according to Tappi Standard T205 m–58 in order to compare the optical, strength and retention properties of the fillers, the only modification of the Tappi Standard being that cellulose acetate butyrate filler was added to the beaten pulp to give the filler levels indicated below. The screen on the sheet mold on which the handsheets were formed was 150 mesh, and the consistency of the pulp and fillers was .15%.

TABLE 2

| Filler | Acetone Resin Ratio | Nozzle Dist. (in.) | Basis Wt. (g./m.²) | LRL Bright. | B & L* Opacity | Strength No. | Percent Filler in sheet | Percent Filler Retention |
|---|---|---|---|---|---|---|---|---|
| Example 2 | 13.3-1 | 4½ | 59.2 | 72.8 | 88.7 | 10.6 | 11.4 | 63 |
| Example 3 | 10-1 | 1 | 64.0 | 75.1 | 90.0 | 11.0 | 14.7 | 82 |
| Example 4 | 8-1 | 1 | 66.8 | 75.2 | 90.0 | 10.9 | 14.8 | 82 |
| Example 5 | 6.6-1 | 1 | 62.8 | 74.8 | 89.8 | 10.6 | 15.8 | 88 |
| Example 6 | 10-1 | 4½ | 59.3 | 75.4 | 90.0 | 9.9 | 13.8 | 76 |
| Example 7 | 8-1 | 4½ | 59.7 | 75.2 | 90.0 | 10.0 | 15.1 | 84 |
| Example 8 | 6.6-1 | 4½ | 59.2 | 74.8 | 89.8 | 10.0 | 15.5 | 86 |
| Control | | | 55.1 | 66.5 | 81.3 | 12.7 | | |

*Opacity corrected to 60 g./m.² basis weight.

It can be seen from the above that opacity was improved from 7 to 9 units over the control by use of the novel fillers of this invention, and that brightness was increased from 6 to 9 units with filler addition, all without any significant loss in strength. With respect to filler retention, the percentage of filler retained in the sheet increased with decreasing acetone-acetate ratios in the spray formulation.

Each of the fillers of Examples 2–8 was incorporated into a papermaking furnish and basestocks were prepared on a papermachine. A standard Luke Mill Blend pulp (70% hardwoods, 30% pine), beaten to 86 seconds Williams freeness, provided the natural cellulose fiber furnish for the runs. Three control runs, one consisting of basestock containing 100% pulp fibers, another containing 8% coating clay, and a third containing 8% $TiO_2$, were also prepared. In those runs where the novel fillers were used, the filler content was approximately 8%. The optical properties of the uncalendered basestocks were as follows:

TABLE 3

| Filler | LRL Brightness | | B & L Opacity* |
|---|---|---|---|
| | W | F | |
| None | 72.4 | 72.4 | 65.7 |
| Clay | 73.4 | 73.5 | 74.0 |
| $TiO_2$ | 79.5 | 79.7 | 82.4 |
| Example 2 | 75.3 | 76.4 | 75.7 |
| Example 3 | 75.1 | 75.4 | 74.5 |
| Example 4 | 75.7 | 76.5 | 76.5 |
| Example 5 | 75.9 | 76.6 | 76.6 |
| Example 6 | 75.8 | 76.8 | 77.7 |
| Example 7 | 76.9 | 78.0 | 75.2 |
| Example 8 | 75.3 | 76.2 | 75.5 |

* Opacity values corrected to 28 lbs./ream basis weight.

It can be seen that all of the novel fillers improved optical properties more than the clay filler and somewhat less than the $TiO_2$ filler.

The basestocks from above were calendered with 2 nips of a steel-steel calender stack loaded to 200 p.l.i., with the following results:

TABLE 4

| Filler | Basis Wt. (lbs./rm.) | LRL Bright. | | B & L Opacity* | Bekk | | Percent Filler | Percent Filler Retention |
|---|---|---|---|---|---|---|---|---|
| | | W | F | | W | F | | |
| None | 28.5 | 71.9 | 71.9 | 65.7 | 30 | 30 | None | |
| Clay | 28.6 | 73.2 | 73.7 | 73.7 | 32 | 30 | 7.7 | 30 |
| $TiO_2$ | 28.3 | 79.5 | 79.5 | 82.8 | 26 | 24 | 8.8 | 40 |
| Example 2 | 26.3 | 74.9 | 75.9 | 75.3 | 38 | 38 | 6.6 | 53 |
| Example 3 | 31.3 | 74.2 | 74.6 | 74.5 | 51 | 47 | 5.4 | 54 |
| Example 4 | 30.4 | 75.0 | 75.9 | 75.8 | 50 | 42 | 7.9 | 59 |
| Example 5 | 28.7 | 74.8 | 75.7 | 76.2 | 42 | 45 | 7.7 | 86 |
| Example 6 | 27.6 | 75.2 | 76.3 | 77.1 | 33 | 35 | 8.5 | 80 |
| Example 7 | 29.1 | 76.0 | 77.3 | 74.8 | 26 | 24 | 6.8 | 72 |
| Example 8 | 27.8 | 74.8 | 75.8 | 74.9 | 20 | 18 | 7.5 | 80 |

* Opacity values corrected to 28 lbs./ream basis weight.

It can be seen from the above that those novel fillers produced at a nozzle distance of 1 inch (Examples 1, 3, 4 and 5) effected higher smoothness basestocks (Bekk values) than the other novel or conventional fillers, and that those novel fillers produced at a nozzle distance of 4½ inches gave smoothness properties equal to the conventional fillers. As was the case with handsheets, filler retention increased with increasing solids level in the spray solutions. It is to be noted that the retention levels of the novel fibrous fillers were much higher than those of the conventional fillers.

Figure 3:
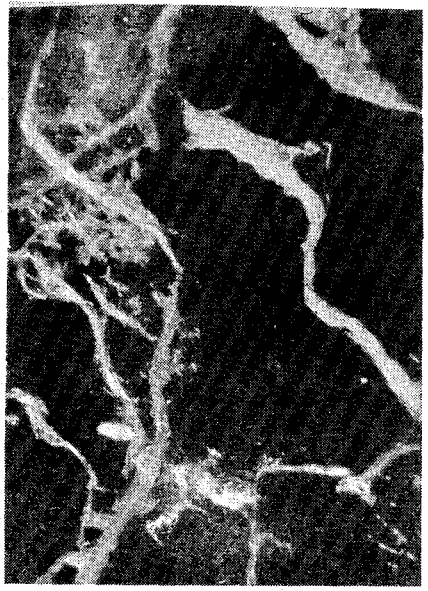
FIGURES 3–6 are photomicrographs at 300× magnification showing fillers produced at a one inch nozzle distance from the precipitating bath, from spray formulations with varying solvent-resin ratios.
Figure 4:
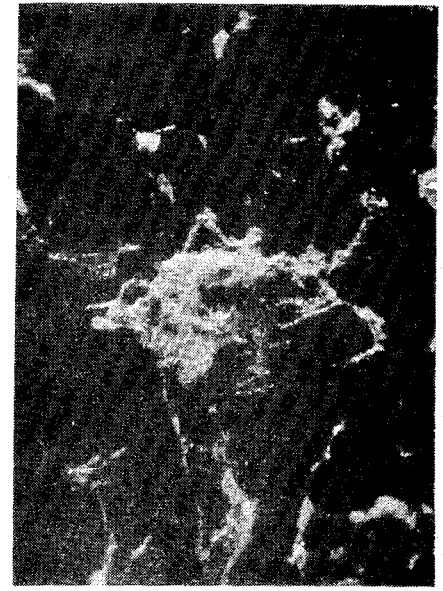
Figure 5:
Figure 6:
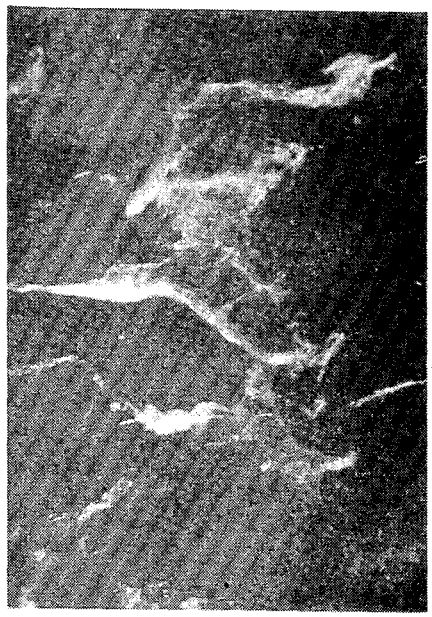
Figure 9:
FIGURES 7–10 are photomicrographs at 300× magnification showing fillers produced at a 4½ inch nozzle distance from the precipitating bath, from spray formulations with varying solvent-resin ratios.
Figure 10:
Figure 7:
Figure 8:

Of importance to the papermaking process, the use of the novel fibrous fillers of this invention results in smaller decreases in strength properties than when conventional fillers are used:

mottled product when incorporated into paper. FIGURE 3 is a photomicrograph at 300× magnification showing a blushed cellulose acetate butyrate filler produced at a one inch nozzle distance from the precipitating bath with a 6.6 to 1 acetone-butyrate ratio in the spray formulation, using an atomizing nozzle having a fluid orifice diameter of .040 inch, and an air pressure of 80 p.s.i.g. FIGURES 4, 5 and 6 are similar photomicrographs of blushed fillers produced under the same conditions from spray formulations having acetone-butyrate ratios respectively of 8 to 1, 10 to 1, and 13.3 to 1. In all instances, it can be seen that a white, opaque, fibrous material, free of shot, was produced.

FIGURES 7, 8, 9 and 10 are photomicrographs at 300× magnification showing blushed cellulose acetate

TABLE 5

| Filler | Basis Wt. (lbs./rm.) | Burst | Tear | | Fold | | Tensile | |
|---|---|---|---|---|---|---|---|---|
| | | | MD | CD | MD | CD | MD | CD |
| None | 28.5 | 18 | 22.1 | 30.9 | 60 | 12 | 9.2 | 3.3 |
| Clay | 28.6 | 10 | 23.2 | 30.1 | 10 | 3 | 5.1 | 2.0 |
| TiO₂ | 28.3 | 11 | 22.4 | 29.6 | 10 | 2 | 5.4 | 1.8 |
| Example 2 | 26.3 | 14 | 20.5 | 26.7 | 23 | 7 | 5.2 | 2.3 |
| Example 3 | 31.3 | 15 | 25.0 | 31.8 | 23 | 7 | 6.2 | 2.5 |
| Example 4 | 30.4 | 12 | 25.1 | 27.0 | 20 | 4 | 7.5 | 2.8 |
| Example 5 | 28.7 | 12 | 22.9 | 24.6 | 23 | 6 | 6.1 | 2.6 |
| Example 6 | 27.6 | 14 | 21.6 | 29.0 | 20 | 5 | 6.7 | 2.5 |
| Example 7 | 29.1 | 15 | 23.7 | 29.0 | 18 | 5 | 6.8 | 2.4 |
| Example 8 | 27.8 | 14 | 22.2 | 27.2 | 23 | 6 | 6.3 | 2.4 |

The basestocks containing the fillers of Examples 3–8 above were coated with a conventional paper coating composition to determine if the novel fillers were receptive to coating and to determine if the improvements noted above in the basestocks carried through the coating operation. The aqueous coating composition comprised, by weight, 1 part chalk, 4 parts TiO₂, and 67 parts clay, with 14.5% starch and 4.9% latex on the pigment content as binder material. The basestocks were coated with an inverted trailing blade coater. The coated and dried basestocks were supercalendered at 800 p.l.i. with 3 nips on the felt side and 3 nips on the wire side. The following data was gathered on the calendered papers:

butyrate fillers produced under identical conditions as above with a 4½ inch nozzle distance from spray formulations having, respectively, acetone-butyrate ratios of 6.6 to 1, 8 to 1, 10 to 1, and 13.3 to 1. At the 4½ inch nozzle distance, the influence of surface tension becomes more pronounced, and it is evident that some fibers have started to contract and drops have formed at the ends. With the 13.3 to 1 acetone-butyrate ratio, it is apparent from FIGURE 10 that much shot is formed. Thus, while we have found this formulation and nozzle distance to be acceptable, it is preferred to increase the solids of the spray formulation or to spray at a one inch nozzle distance. It can be seen, however, that the novel blushed

TABLE 6

| Filler | Basis Wt. (lbs./rm.) | LRL Bright. | | B & L Opacity | Bekk (secs.) | | Gloss | | Williamsburg Printability | |
|---|---|---|---|---|---|---|---|---|---|---|
| | | W | F | | W | F | W | F | W | F |
| None | 37.2 | 72.7 | 72.4 | 81.3 | 397 | 356 | 24 | 23 | 26.2 | 29.8 |
| Clay | 36.9 | 73.3 | 73.1 | 83.9 | 415 | 308 | 27 | 24 | 20.0 | 26.0 |
| TiO₂ | 37.9 | 77.0 | 77.2 | 88.9 | 537 | 427 | 28 | 26 | 16.2 | 17.8 |
| Example 3 | 36.9 | 74.2 | 74.4 | 84.2 | 757 | 693 | 30 | 31 | 14.4 | 13.4 |
| Example 4 | 36.9 | 74.5 | 75.0 | 86.1 | 638 | 648 | 31 | 33 | 13.4 | 6.0 |
| Example 5 | 36.8 | 74.7 | 75.1 | 85.6 | 733 | 697 | 31 | 33 | 14.4 | 8.4 |
| Example 6 | 35.5 | 73.6 | 74.4 | 84.7 | 697 | 538 | 27 | 30 | 14.2 | 14.0 |
| Example 7 | 37.0 | 74.8 | 75.2 | 84.7 | 694 | 663 | 29 | 31 | 15.4 | 13.8 |
| Example 8 | 39.0 | 73.5 | 74.0 | 85.5 | 647 | 633 | 27 | 30 | 22.3 | 17.7 |

On a printability scale running from 2 (best) to 30 (poorest), it can be seen from the above that better printability results with the use of the novel fillers of this invention as compared to the use of conventional fillers. For instance, the Example 5 filler gave a 6 unit wire side and 16 unit felt side printability advantage over the clay filler control run, and gave a 2 unit wire side and 7 unit felt side advantage over the paper containing TiO₂. As with the uncoated basestocks, the novel fillers fell between clay and TiO₂ in improving brightness and opacity. In general, the novel fillers produced smoother and glossier papers than mineral fillers such as clay and TiO₂.

It has been previously mentioned that if a distance of over about 4½ inches from the spray nozzle to the precipitating bath is employed, the product tends to lose its fibrous nature in favor of spherical-like particles known as "shot." These particles, if retained at all, produce a materials of this invention may take several particulate forms, such as fibers and shot.

*Examples 9 and 10*

The novel fillers of this invention were prepared by spraying formulations having a 13.3 to 1 and a 10 to 1 acetone-butyrate ratio through a spray nozzle with an orifice diameter of .028 inch, in the process according to FIGURE 1. When incorporated into basestocks at the 8% level, these fillers gave a 3.5 unit brightness advantage and a 10 unit opacity advantage over the control basestock containing no filler material, and a 2 unit brightness and a 1.5 unit opacity advantage over the basestock containing 8% clay.

*Examples 11–16*

In order to increase the rate of filler production nozzles with larger orifices were used, and it was found that the amount of filler produced could be doubled by increasing the nozzle orifice diameter from .040 inch to .100 inch.

In Examples 11–16, a single formulation was used, consisting of a 6.6 to 1 acetone-butyrate ratio. The following spray formulation was prepared and used:

| | Parts by wt. |
|---|---|
| Acetone | 1500 |
| Water | 500 |
| Sodium Stearate | 10 |
| Scrap cellulose acetate butyrate (80%) | 225 |

All fillers were prepared according to the process of FIGURE 1, except that a Lightning mixer was used in place of the air driven agitator, and twin propellers, the top one having a saw-tooth configuration, were used. Four fillers, Examples 11–14, were prepared with the .040 inch fluid orifice diameter nozzle. The Example 15 filler was prepared with a .060 inch fluid orifice diameter nozzle, and the Example 16 filler was prepared with a nozzle having a .100 inch orifice diameter. The air nozzle pressure in each instance was 80 p.s.i.g. The distance from the nozzle to the precipitating bath was approximately 1 inch. In all instances, blushed fibers of cellulose acetate butyrate were produced by spraying the spray formulation into a precipitating bath of water. To illustrate the increased throughput rates with larger orifices, it was found that it took from 405 to 420 seconds to spray 200 grams of the formulation in the four runs at a .040 inch nozzle orifice diameter, while it took 270 and 180 seconds at .060 and .100 inch diameters, respectively, to spray the same amount.

The fillers of Examples 11–16 were incorporated at levels of 4% and 8% into basestocks prepared from Luke Mill Blend pulp beaten to 90 seconds Williams freeness. The basestocks contained 7% clay filler, giving a total combined filler content of 11% and 15%. For comparison purposes, a 30 pound basestock having 7% clay was produced, and 26 pound basestocks having 7% clay in one instance, 7% clay and 4% of the novel fillers in another instance, and 7% clay and 8% of the novel fillers in still another set of runs, were produced. The uncalendered basestocks exhibited the following properties:

It can be seen from the above that all of the novel fibrous fillers contributed to significant improvements in the optical properties of the basestocks. The addition of about 4 or 8% of the fillers to the 26 pound basestock having 7% clay present gave major increases in brightness and opacity. Also, with the addition of the novel fillers to the 26 pound paper, it is possible to produce a 26 pound paper having the optical properties of a conventional 30 pound paper. Prior to the use of the novel filler, this was impossible since with the addition of conventional fillers, strength properties greatly decrease as evidenced by the data below. A 30 pound control basestock of the Luke Mill Blend pulp, containing 12.2% filler clay, was produced and calendered two nips at 200 p.l.i. This basestock was compared with a 26 pound basestock containing 7% clay and with 26 pound basestocks containing 7% clay and either 4 or 8% of the fillers of Examples 11–16, calendered under identical conditions:

TABLE 8

| Filler | Basis Wt. (lbs./rm.) | Percent Clay | Percent Novel Filler | Burst | Fold | |
|---|---|---|---|---|---|---|
| | | | | | MD | CD |
| Control | 30.1 | 12.2 | 0 | 7 | 2 | 0 |
| Clay | 25.9 | 6.6 | 0 | 11 | 19 | 3 |
| Example 11 | 26.4 | 7.0 | 4.5 | 10 | 14 | 4 |
| Do | 26.1 | 7.1 | 8.8 | 10 | 12 | 4 |
| Example 12 | 24.7 | 7.1 | 4.4 | 10 | 14 | 4 |
| Do | 27.2 | 6.8 | 8.6 | 11 | 15 | 3 |
| Example 13 | 26.6 | 6.5 | 5.1 | 10 | 12 | 2 |
| Do | 25.2 | 6.4 | 9.0 | 10 | 10 | 3 |
| Example 14 | 25.6 | 7.5 | 4.5 | 9 | 14 | 2 |
| Do | 25.8 | 6.5 | 9.1 | 9 | 12 | 2 |
| Example 15 | 26.4 | 6.8 | 4.8 | 10 | 12 | 3 |
| Do | 25.8 | 6.9 | 9.4 | 9 | 10 | 2 |
| Example 16 | 26.6 | 7.0 | 5.1 | 9 | 12 | 2 |
| Do | 26.0 | 7.0 | 9.8 | 8 | 9 | 2 |

It can be seen that the lighter 26 pound basestocks, having a total filler content of 11% (7% clay and 4% novel filler) or 15% (7% clay and 8% novel filler), have better burst and fold properties than the heavier 30 pound basestock with 12% clay. It is thus evident that filler clay greatly reduces the strength properties of paper as compared to the novel fillers of this invention.

The fibrous fillers set forth in Examples 1–16 were white, bright, and opaque and exhibited fiber lengths ranging from about .03 mm. to 1.86 mm., with diameters ranging from about 2 to 51 microns.

*Example 17*

A blushed cellulose acetate filler was produced from a spray formulation having a 6.6 to 1 acetone-acetate ratio, the formulation being sprayed into a water bath from a nozzle having a fluid orifice of .040 inch at a nozzle distance of about one inch. Basestocks were prepared which included the cellulose acetate filler. Other basestocks were prepared and fillers of the type produced in Examples 11–14 (cellulose acetate butyrate) were incorporated therein. Another basestock was prepared into which chopped filaments of the unblushed cellulose acetate were incorporated, and an additional basestock was prepared into which fibers of blushed cellulose acetate,

TABLE 7

| Filler | Basis Weight (lbs./rm.) | Percent Clay | Percent Novel Filler | Percent Retention | LRL Bright. | | B & L Opacity | Bekk | |
|---|---|---|---|---|---|---|---|---|---|
| | | | | | W | F | | W | F |
| Clay | 29.5 | 6.8 | | 30.0 | 70.3 | 70.4 | 74.8 | 7 | 5 |
| Do | 25.9 | 6.6 | | 30.0 | 69.5 | 69.3 | 71.9 | 6 | 5 |
| Example 11 | 26.4 | 7.0 | 4.5 | 77.6 | 71.1 | 71.1 | 75.5 | 8 | 6 |
| Do | 26.1 | 7.1 | 8.8 | 77.8 | 73.7 | 73.7 | 77.2 | 8 | 6 |
| Example 12 | 24.7 | 7.1 | 4.4 | 75.9 | 71.8 | 71.7 | 73.4 | 8 | 7 |
| Do | 27.2 | 6.8 | 8.6 | 75.1 | 71.9 | 72.1 | 78.5 | 8 | 7 |
| Example 13 | 26.6 | 6.5 | 5.1 | 87.9 | 70.6 | 70.7 | 75.6 | 7 | 6 |
| Do | 25.2 | 6.4 | 9.0 | 79.7 | 73.8 | 73.9 | 75.9 | 7 | 6 |
| Example 14 | 25.6 | 7.5 | 4.5 | 77.5 | 72.2 | 72.2 | 74.9 | 7 | 6 |
| Do | 25.8 | 6.5 | 9.1 | 79.8 | 74.1 | 74.1 | 77.1 | 7 | 6 |
| Example 15 | 26.4 | 6.8 | 4.8 | 82.7 | 71.2 | 71.2 | 74.2 | 7 | 5 |
| Do | 25.8 | 6.9 | 9.4 | 83.1 | 74.2 | 74.3 | 77.3 | 7 | 6 |
| Example 16 | 26.6 | 7.0 | 5.1 | 87.9 | 72.2 | 72.2 | 76.0 | 6 | 5 |
| Do | 26.0 | 7.0 | 9.8 | 86.7 | 73.8 | 73.8 | 78.3 | 6 | 5 | made from a spray formulation having a 6.6 to 1 acetone-acetate ratio and containing 10 parts di-n-butyl sebacate plasticizer per 100 parts cellulose acetate, by weight, were incorporated.

TABLE 9

| Filler | Basis Wt. (g./m.²) | Percent Filler | LRL Bright. | B & L Opacity | Scattering Coefficient | Strength No. |
|---|---|---|---|---|---|---|
| Unblushed Cell. Acetate | 60.4 | 8.6 | 66.4 | 75.7 | .060 | 16.1 |
| Blushed Cell. Acetate Butyrate | 59.1 | 8.5 | 72.0 | 83.2 | .270 | 16.1 |
| Blushed Cell. Acetate | 59.0 | 8.7 | 68.0 | 79.9 | .130 | 16.5 |
| Blushed Cell. Acetate with Plasticizer | 59.2 | 8.3 | 69.8 | 82.6 | .220 | 15.4 |
| Clay | 58.5 | 8.1 | 70.2 | 80.1 | .190 | 13.6 |
| TiO₂ | 58.5 | 8.2 | 75.5 | 88.5 | .540 | 13.6 |
| 100% Pulp | 59.0 |  | 64.6 | 74.3 | .035 | 17.5 |

The blushed filler materials were significantly better in providing improved optical properties, giving more opacity and brightness than the unblushed material, with no loss in strength. The unblushed material gave improvements even below the improvements contributed by the use of clay. Again, it can be seen that the novel fillers do not reduce strength as extensively as clay or titanium dioxide.

*Example 18*

Figure 2:
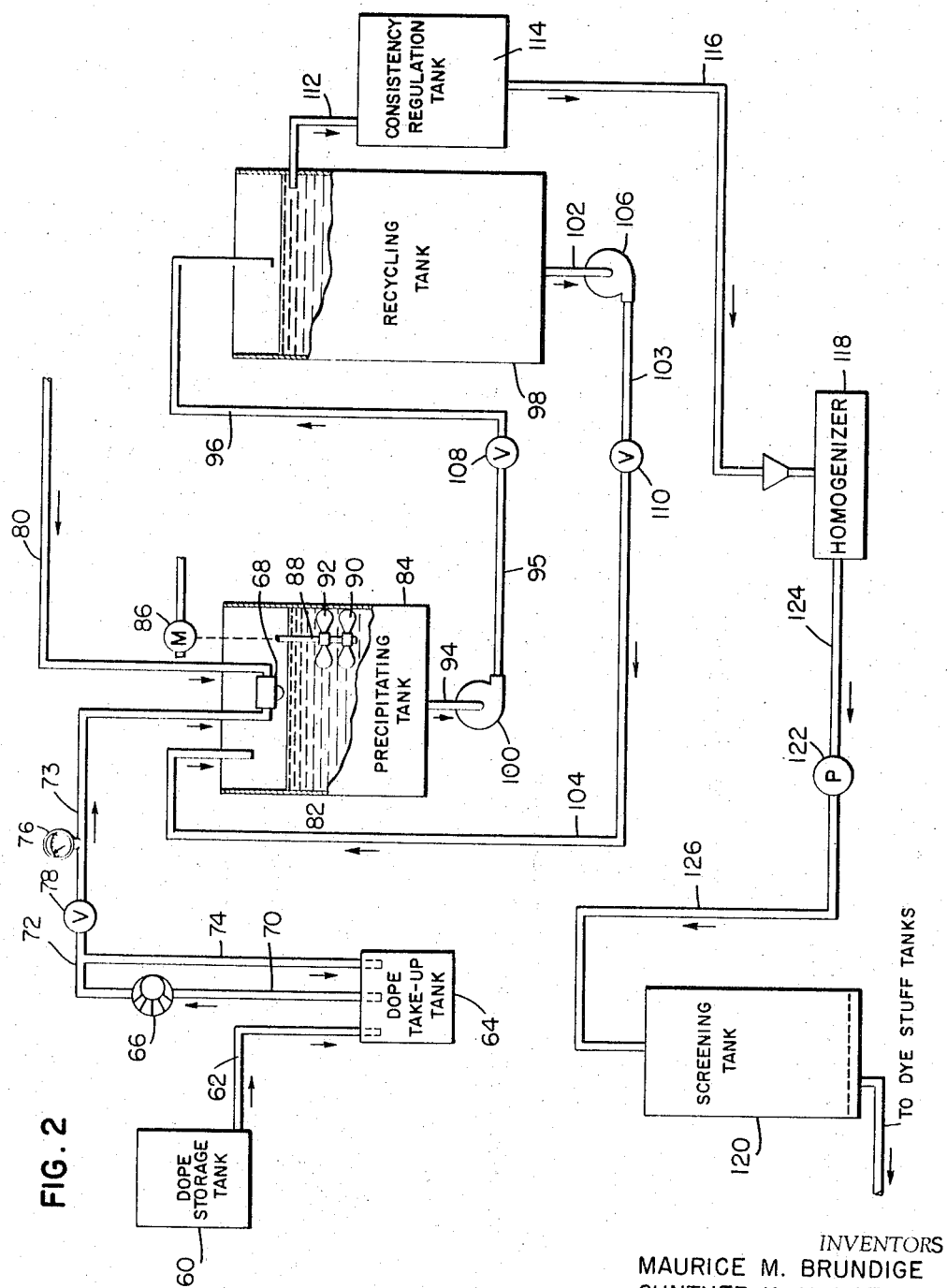
FIGURE 2 is a diagrammatic illustration of a process and apparatus for the commercial production of a novel filler material of this invention.

The novel filler materials of this invention have been incorporated into basestocks manufactured on a commercial size paper machine, and no machine runnability problems occurred. In one mill trial, the filler was produced in accordance with the process and equipment illustrated in FIGURE 2.

For this trial, the spray formulation by weight comprised 165 parts acetone, 55 parts water, 25 parts cellulose acetate butyrate and 1.1 parts sodium stearate soap. As in the previously described runs, the sodium stearate was dissolved in the water component which had been heated to about 60–70° C., and after the soap solution cooled to about 40° C., it was added to the acetone under agitation. Then the cellulose acetate butyrate was added to complete the spray formulation. The formulation was held in storage tank 60 prior to its use. The spray solution flowed by gravity from tank 60 through conduit 62 to a take-up vessel 64. A ¼ H.P. vane pump 66 supplied the spray formulation under pressure to spray nozzles 68 via conduits 70, 72, and 73. For this trial, two spray nozzles, identical in size and mode of operation, were used, and the description of one will serve as a description of both. Pressure relief by-pass 74 connected conduit 72 with vessel 64. Pressure gauge 76 provided means for determining the formulation feed rate, and gate valve 78 controlled the flow of formulation to nozzle 68. Air was supplied to the atomizing spray nozzle 68 by means of conduit 80 which connected with the mill air supply. Nozzle 68 had a .040 inch fluid orifice diameter and nozzle 68 was positioned at a distance of from about ½ to 1 inch from the precipitating bath of water 82 in tank 84. Agitation of the bath 82 was supplied by Lightning mixer 86 driving shaft 88 and twin propellers 90 and 92.

The spray formulation was forced through nozzle 68 and blushed fibers of cellulose acetate butyrate, having a microporous structure, were emitted and continued blushing to completion in tank 84. The filler slurry was then pumped through conduits 94, 95, and 96 to recycling tank 98 by means of centrifugal pump 100. In tank 98, the filler material floated on the surface while the clear liquid was circulated back to precipitating tank 84 by means of conduits 102, 103, and 104 and centrifugal pump 106. Gate valves 108 and 110 controlled the flow of filler to tank 98 and the flow of liquid back to tank 84.

The floating filler in tank 98 was transferred from tank 98 by means of conduit 112 connecting with consistency regulation tank 114 in which the filler was diluted to between 1 and 2% consistency. From tank 114, the diluted filler traveled by means of conduit 116 to homogenizer 118 and was then pumped to 80 mesh screening tank 120 by means of positive displacement pump 122 and conduits 124 and 126. The screened filler was then transferred from tank 120 to the mill dyestuff tanks and from there to a stuff box where the filler was added to the papermaking furnish. The filler made up 5.9% of the total furnish. Samples of the filler exhibited an LRL brightness level of 90+.

A lightweight paper (28 to 30 pounds per ream) was produced on a commercial paper machine running at 450 f.p.m. The virgin pulp consisted of 70% hardwoods and 30% pine supplemented by about 5% general broke. The inorganic ash content was held constant at 5.4%. It should be noted that there was no closed white water system in operation. Acetone extractions of the manufactured paper showed 4.9% filler in the paper, which meant a retention of 83% for the trial, and a higher average could be expected if a closed white water system had been used. The basestock produced exhibited the following properties:

TABLE 10

| Filler | Basis Wt. (lbs./rm.) | LRL Bright. | | B & L Opacity | Burst | Tear | | Fold | | Tensile | |
|---|---|---|---|---|---|---|---|---|---|---|---|
| | | W | F | | | MD | CD | MD | CD | MD | CD |
| Control | 28.8 | 78.9 | 79.0 | 71.8 | 13 | 13.7 | 14.8 | 16 | 16 | 7.0 | 3.9 |
| Filler | 29.2 | 80.0 | 80.2 | 73.8 | 12 | 13.9 | 15.0 | 14 | 13 | 6.5 | 3.5 |

From Table 10, it can be seen that brightness increased more than a unit and opacity increased by 2 units over the control basestock by use of the novel filler material at approximately a 5% substitution level and, in general, tests have shown that at least about 1% of the total fiber content of natural cellulose and novel filler should be made up by the novel filler in order to effect significant improvements in optical properties. Only slight strength losses were noted even though the filler was substituted directly for the wood fiber component of the furnish.

From the above examples, it is evident that novel blushed fibrous filler materials, having great utility, can be produced. While cellulose acetate butyrate is the preferred resin, other resins such as cellulose acetate and benzyl cellulose will produce blushed fibrous materials when sprayed in the manner described.

It will be noted that a homogenizer has been used to treat the blushed fibrous materials. Such use is optional and may be desirable for breaking up agglomerates, but its uses is not a necessary step in the production of the blushed fibrous materials.

*Example 19*

It will also be noted that a fatty acid soap has been used in all the spray formulations, and other wetting agents may be used, as previously noted. However, blushed fibrous filler can be produced without the use of any wetting agent. In an early run, 100 parts cellulose cetate butyrate were dissolved in 1500 parts acetone (giving an acetone-butyrate weight ratio of 15 to 1) and then 500 parts water were added. The spray formulation was sprayed through an atomizing nozzle having an orifice diameter of .040 inch which was located about ½ inch from a precipitating bath of water. Blushed fibrous filler was produced and then added to a Luke Mill Blend pulp at a level of 8.6% from which a 30 pound basestock was prepared. The novel filler effected a brightness gain of 3.5 units and an opacity gain of 5.5 units over the control basestock.

Wetting agents other than a fatty acid soap may be emplowed in the spray formulations of this invention. Wetting agents used, other than such a soap, are trisodium phosphate, sodium phosphate, nonylphenoxypoly (ethyleneoxy) ethanol, polyalkylene glycol, and polyoxyethylinated-alkyl amino-amide. These materials have been used in the spray formulations in amounts varying up to about 5% of the water component of the formulation, and it has been found that mixtures of one or more of the wetting agents can be used in the spray formulations. The only difference noted by the use of one wetting agent as opposed to another is in the relative smoothness of the paper into which the filler is incorporated, with the smoothest papers resulting from furnishes into which fillers made from solutions including a fatty acid soap or sodium or trisodium phosphate, were incorporated.

*Example 20*

As previously state, plasticizers may be added to the spray formulations to effect improvements in the optical properties of the fibrous fillers produced. The following formulations, by weight, were prepared using Du Pont Plastacelle cellulose acetate flake as the cellulose ester, and the formulations were sprayed through an atomizing spray nozzle having a fluid orifice diameter of .040 inch, the nozzle distance from the precipitating bath of water being about one inch, to produce the novel fibers:

TABLE 11

| Filler No. | Parts Acetone | Parts Water | Parts Soap | Parts Cellulose Acetate | Parts Plasticizer |
|---|---|---|---|---|---|
| 130 | 375 | 125 | 2.5 | 56 | 0 |
| 129 | 375 | 125 | 2.5 | 56 | 5.6 |
| 131 | 375 | 125 | 2.5 | 56 | 10.2 |
| 132 | 375 | 125 | 2.5 | 56 | 16.8 |
| 133 | 375 | 125 | 2.5 | 56 | 28.0 |

The plasticizer used was di-n-butyl sebacate, and it can be seen that the plasticizer used in runs 129, 131, 132, and 133 represented, respectively, ratios by weight of 10 parts 20 parts, 30 parts, and 50 parts plasticizer per 100 parts of cellulose ester in the spray formulation. Handsheets with a basis weight of approximately 60 pounds per 3300 sq. ft. were prepared from 100% Luke Mill Blend pulp, and from the pulp including each of the fillers, with the following results:

TABLE 12

| Filler | Percent Filler in Sheet | Parts Plasticizer per parts CA | LRL Bright. | B & L Opacity | Strength No. | Scattering Coefficient of Filler |
|---|---|---|---|---|---|---|
| None | 0 | 0 | 65.8 | 75.7 | 19.0 | |
| 130 | 8.7 | 0 | 68.0 | 79.9 | 16.5 | .13 |
| 129 | 8.3 | 10 | 69.8 | 82.6 | 15.4 | .22 |
| 131 | 8.7 | 20 | 70.3 | 83.1 | 14.2 | .22 |
| 132 | 9.4 | 30 | 70.3 | 84.3 | 13.4 | .22 |
| 133 | 9.5 | 50 | 70.3 | 83.3 | 12.9 | .21 |

It can be seen that with the use of plasticizer, improvements in optical properties of the filler can be effected but with some loss in strength properties. Additions of plasticizer above 10 parts per 100 parts cellulose ester have little, if any, effect on the scattering power of the filler. However, more than 10 parts plasticizer may be used if the strength requirements of the finished paper permit.

*Example 21*

The novel fibrous fillers of this invention may be prepared from mixtures of cellulose esters as well as from an individual ester. One formulation, with a 6.6 to 1 acetone to total cellulose ester content, was prepared as follows:

Run 140: Parts by wt.
  Acetone _____ 750
  Soap (sodium stearate) _____ 5
  Water _____ 250
  Cellulose acetate butyrate scrap (80%) _____ 50.9
  Cellulose acetate, containing 6% TiO$_2$ _____ 61.8

A second formulation, having a 4 to 1 acetone to total cellulose ester content, was prepared as follows:

Run 141-A: Parts by wt.
  Acetone _____ 750
  Water _____ 250
  Soap (sodium stearate) _____ 5
  Cellulose acetate butyrate scrap (80%) _____ 85.1
  Cellulose acetate, containing 6% TiO$_2$ _____ 102.4

The above two formulations were sprayed with a .040 inch fluid nozzle at a distance of about one inch from the precipitating bath to produce fibrous fillers. Handsheets, containing approximately 8% filler, were prepared and exhibited the following properties:

| Filler | Basis Wt. (g./m.$^2$) | LRL Bright. | B & L Opacity | Burst | Fold |
|---|---|---|---|---|---|
| None | 59.7 | 68.0 | 76.0 | 38 | 41 |
| Run 140 | 58.9 | 71.8 | 83.1 | 42 | 46 |
| Run 141-A | 58.4 | 72.0 | 83.2 | 37 | 32 |

From the above, it can be noted that both formulations produced fillers which improved the optical properties of paper when incorporated therein at the 8% level. The cellulose esters may be mixed in any ratio with no adverse effect upon the filler produced, but it can be noted that the filler with the higher acetone to resin ratio produced a stronger filler.

Cellulose acetate fillers have been found to perform quite well in mill trials. A cellulose acetate filler was produced, in accordance with the process described in connection with Example 18 and illustrated in FIGURE 2, from a spray solution having an acetone to acetate ratio of 6 to 1. This filler was incorporated into the furnish for a 33 pounds basis weight paper being produced from Luke Mill Blend pulp, at a retained level of approximately 2.8%. The filler produced a 0.6 unit improvement in LRL brightness and a 2.2 unit improvement in B & L opacity over the basestock.

The fillers of this invention, due to their fibrous nature, are greatly distinguishable from conventional filler material. Water leaves of 100% of the novel fillers of this invention can be made. A fibrous filler produced from a spray formulation having an acetone to cellulose acetate butyrate ratio of 6.6 to 1 was water-laid on a sheet forming screen, and handsheets of the filler material were produced. These handsheets had a basis weight of 29.8 pounds per 3300 sq. ft. and exhibited an LRL brightness of 91.2 and a B & L opacity of 96.8. It can thus be seen that the novel fibrous fillers are capable of felting with each other as well as with other fibers, such as conventional papermaking fibers, and that the novel fillers are bright and opaque.

While acetone has been set forth as the preferred solvent for the resin in the spray solution, other water-miscible organic solvents, such as methyl Cellosolve acetate, ethyl lactate, and a mixture of 9 parts acetone to 1 part methanol by weight, may be used in the spray solution. Non-solvents other than water, which are miscible with acetone, such as methanol and ethanol, may also be used in place of water in the spray solution and precipitating medium.

Various changes may be made in the examples specifically set forth above without departing from the spirit of our invention or the scope of the appended claims.

We claim:

1. The process of producing a porous, opaque fibrous filler suitable for use in papermaking furnishes which comprises the steps of preparing a spray solution containing a cellulose ester dissolved in a carrier which includes an organic solvent in which the cellulose ester is soluble and a first liquid non-solvent for the cellulose ester which is miscible with the organic solvent and is present in a proportion up to that which is just short of causing the cellulose ester to precipitate, disrupting the solution with air under pressure and spraying the solution into the atmosphere, thereby forming discrete fibers having a length ranging from about .03 mm. to about 1.86 mm., and collecting the fibers in a second liquid non-solvent which is miscible with the organic solvent in the spray solution and thereby diluting the organic solvent remaining throughout said fibers with said second liquid non-solvent, to maintain the fibrous structure of said fibers.

2. The process of claim 1 in which the resin is cellulose acetate butyrate.

3. The process of claim 1 in which the cellulose ester is cellulose acetate.

4. The process of claim 1 in which the resin is a mixture of cellulose esters.

5. The process of claim 4 in which the cellulose esters are cellulose acetate and cellulose acetate butyrate.

6. The process of claim 1 in which the cellulose ester is cellulose acetate butyrate, the organic solvent is acetone, and the first and second liquid non-solvents are water.

7. The process of claim 1 in which the cellulose ester is cellulose acetate, the organic solvent is acetone, and the first and second liquid non-solvents are water.

8. The process of claim 6 in which the spray solution contains a wetting agent.

9. The process of claim 8 in which the wetting agent is selected from the group consisting of fatty acid soaps, trisodium phosphate, sodium phosphate, nonylphenoxypoly (ethyleneoxy) ethanol, polyalkylene glycol, and polyoxyethylinated-alkyl amino-amide.

10. The process of claim 8 in which the wetting agent is a fatty acid soap.

11. The process of claim 10 in which the fatty acid soap is sodium stearate soap.

12. The process of claim 6 in which the spray solution contains a plasticizer.

13. The process of claim 12 in which the plasticizer is di-n-butyl sebacate.

14. The process of producing a porous, opaque fibrous filler suitable for use in papermaking furnishes which comprises the steps of preparing a spray solution containing a cellulose ester dissolved in a carrier which includes acetone and water, the acetone-cellulose ester weight ratio ranging from about 3 to 1 to about 15 to 1 and the amount of water present varying by weight up to about 1 part water for 3 parts acetone, disrupting the solution with air under pressure and spraying the solution through an atomizing nozzle into the atmosphere, thereby forming discrete cellulose ester fibers having a length ranging from about .03 mm. to 1.86 mm., and collecting the fibers in a bath of water and thereby diluting the acetone remaining throughout said fibers with the water in the bath, to maintain the fibrous structure of the fibers.

15. The process of claim 14 in which the atomizing nozzle has a fluid orifice ranging in diameter from about .020 inch to .100 inch, and in which process the spray solution is sprayed through said nozzle at an air pressure ranging from 40 to 80 pounds per square inch, said nozzle being located at a distance of from about ½ inch to about 4½ inches from the bath of water.

16. The process of claim 15 in which the bath of water is agitated.

17. The process of claim 16 in which the cellulose ester is cellulose acetate butyrate.

18. The process of claim 16 in which the cellulose ester is cellulose acetate.

19. The process of claim 17 in which the spray solution contains up to about 5%, based on the weight of water in the spray solution, of a wetting agent.

20. The process of claim 19 in which the wetting agent is a fatty acid soap.

21. The process of claim 20 in which the fatty acid soap is sodium stearate soap.

22. The process of claim 17 in which the spray solution contains up to about 10 parts by weight of a plasticizer per 100 parts cellulose acetate butyrate.

23. The process of claim 22 in which the plasticizer is di-n-butyl sebacate.

References Cited

UNITED STATES PATENTS

| | | | |
|---|---|---|---|
| 1,826,718 | 10/1931 | Barthelemy | 264—200 |
| 2,072,102 | 3/1937 | Dreyfus et al. | 264—200 |
| 2,086,591 | 7/1937 | Whitehead | 264—200 X |
| 2,238,591 | 4/1941 | Horesi et al. | 264—180 X |
| 2,399,191 | 4/1946 | Abbott | 264—171 X |
| 2,411,660 | 11/1946 | Manning. | |
| 2,460,546 | 2/1949 | Stephanoff. | |
| 2,473,499 | 6/1949 | Abbott | 264—171 X |
| 2,612,679 | 10/1952 | Ladisch | 161—181 X |
| 2,689,199 | 9/1954 | Pesce. | |
| 2,843,583 | 7/1958 | Voris | 106—198 X |
| 2,875,473 | 3/1959 | Mitchell | 264—14 |
| 2,925,412 | 2/1960 | Johnston | 264—11 |
| 2,988,782 | 6/1961 | Guandigue et al. | 161—173 |
| 3,023,075 | 2/1962 | Larman et al. | 264—200 X |
| 3,025,130 | 3/1962 | White | 264—200 X |
| 3,042,970 | 7/1962 | Terenzi | 264—11 |
| 3,068,527 | 12/1962 | Morgan | 264—184 |

FOREIGN PATENTS 296,658    1932    Italy.

ALEXANDER H. BRODMERKEL,
*Primary Examiner.*

DONALD J. ARNOLD, *Examiner.*

J. H. WOO, *Assistant Examiner.*

UNITED STATES PATENT OFFICE
CERTIFICATE OF CORRECTION

Patent No. 3,342,921 September 19, 1967

Maurice M. Brundige et al.

It is hereby certified that error appears in the above numbered patent requiring correction and that the said Letters Patent should read as corrected below.

Column 12, line 71, for "uses" read -- use --; column 13, line 4, for "cetate" read -- acetate --; line 33, for "state" read -- stated --; column 15, lines 41 and 45, for "resin", each occurrence, read -- cellulose esters --.

Signed and sealed this 24th day of September 1968.

(SEAL)
Attest:

Edward M. Fletcher, Jr.
Attesting Officer

EDWARD J. BRENNER
Commissioner of Patents

UNITED STATES PATENT OFFICE
CERTIFICATE OF CORRECTION

Patent No. 3,342,921                          September 19, 1967

Maurice M. Brundige et al.

It is certified that error appears in the above identified patent and that said Letters Patent are hereby corrected as shown below:

Column 12, line 71, "uses" should read -- use --. Column 13, line 4, "cetate" should read -- acetate --; line 33, "state" should read -- stated --. Column 15, lines 41 and 45, "resin", each occurrence, should read -- cellulose ester --.

This certificate supersedes Certificate of Correction issued September 24, 1968.

Signed and sealed this 10th day of February 1970.

(SEAL)
Attest:

Edward M. Fletcher, Jr.                        WILLIAM E. SCHUYLER, JR.
Attesting Officer                                  Commissioner of Patents